Patented May 30, 1939

2,160,371

UNITED STATES PATENT OFFICE 2,160,371

PROCESS FOR APPLYING COATINGS TO HOLLOW BODIES

Ernst Schnabel, Berlin-Lichterfelde, Germany, assignor to Resistoflex Corporation, New York, N. Y., a corporation of New York No Drawing. Application November 30, 1937, Serial No. 177,231. In Germany December 5, 1936

4 Claims. (Cl. 154—2)

This invention relates to the manufacture of various kinds of hollow bodies including conduits such as hose, tubing and the like and containers such as tanks, cans, boxes, etc.

More particularly the invention is a novel process of applying internal coatings of impermeable material to such hollow bodies of permeable material so that they may be used for conducting or containing fluids, either liquid or gaseous.

One of the principal objects of the invention is the lining of conduits or containers formed of woven fabric, such as cotton hose, used to conduct fuels, oils, solvents, and the like, to render them impermeable to the fluids carried by them.

Cans or boxes and similar containers made of cellular material, such as various known fibre compositions, may be lined according to the process.

Heretofore the lining or coating of tubes or containers subsequent to their manufacture has been accomplished by pouring into the tube or container a solution of the lining or coating substance and then letting it run out again. A thin film of the substance was left behind and allowed to dry on. To obtain a coating of substantial thickness by this process it was necessary to repeat it several times.

Another process in use for lining tubes was to form a relatively viscous solution of the coating material and apply it to the inner wall by means of a sleeve pulled through the tube. This also had to be repeated to build up a substantial lining.

In both of the foregoing methods, the work is troublesome, lengthy and expensive. It has, moreover, the distinct disadvantage that it is impossible to control or check the quality, thickness or uniformity of the inner coating formed thereby. There is no way to determine whether the coating is distributed uniformly in the hose, whether it is adhering at all points, or whether there are holes or thin spots, except by cutting open the hose and so destroying it. Even if during subsequent testing, with application of excess internal pressure, it is found that there are defects, it is very difficult to locate them and frequently impossible to repair them. With hollow containers, especially such as have irregular shapes, it is difficult and often impossible to form a coating of uniform thickness from fluid solutions by the prior processes.

A further object of the invention is to eliminate the drawbacks of the processes just described and to make possible the production of an inner coating which can be absolutely controlled as to thickness, uniformity and freedom from defects.

According to the invention the novel process consists essentially in forming, independently of the hollow body that is to be lined, a separate skin or lining, made of the coating or lining substance, which approximates in size and shape the interior surface to be lined. This skin or lining is then introduced into the space and expanded or inflated by internal pressure, compressed air for example, so as to lie tightly against the wall of the hollow body. While in this position, the lining is so acted upon as to alter its condition in such a way that it will permanently assume its expanded shape and penetrate into or intimately adhere to the inner wall of the hollow body.

The practice of the process depends upon the selection of a lining substance or material which can be preformed to the desired shape, inserted into the hollow body, inflated into intimate contact with the walls of the body, and be treated by solvent applied through the permeable body to cause it to soften sufficiently to adhere to the body, and which will, upon drying, permanently maintain its expanded shape. There are a number of substances which meet these requirements, for example, polymerized vinyl compounds such as polyvinyl alcohol, polyvinyl chloride and polyvinyl acetal, polymerized esters of acrylic acid, and polymerization products of dichlor butadiene. Any substance, however, which will meet the conditions required by the process may be used.

As an example of how the process may be practiced we shall select for purposes of illustration the lining of a woven fabric hose with an inner layer of polyvinyl alcohol. As is known, the latter material can be formed into tubes by extruding machines, as shown in Schnabel Patent No. 2,053,112. It is unaffected by hydrocarbon fuels, oils and organic solvents and makes an ideal lining for a hose used to conduct such fluids. It is, however, somewhat soluble in hot water and may be softened by moisture and heat. It is normally flexible and elastic, resembling rubber in these characteristics.

In carrying out the invention, one takes a piece of tubular woven fabric of any desired length and diameter and forms a tube of polyvinyl alcohol having an external diameter slightly less than the internal diameter of the fabric tube and of the same length. The polyvinyl alcohol tube is then drawn into the fabric tube by a cord or wire or other suitable means. One end of this assembly is then closed up air-tight and the other end attached securely to a source of pressure, preferably with a shut-off valve attached to the tubes and capable of being disconnected from the pressure supply after inflation. Pressure is applied to the inside of the inner lining tube which is sufficient to stretch or inflate it, when subsequently softened, so it will make intimate contact with the fabric. The whole is then subjected to the solvent, water, and heat, while under pressure, which softens the lining, and the fabric tube and lining become intimately bonded together. When dried and cooled, preferably while the pressure is still applied, the lining regains its initial toughness and elasticity.

It will be understood that the action of the solvent and the heat are sufficient only to soften the lining, permitting it to assume a new shape, and should not cause it as a whole, to melt, liquefy or flow. It therefore keeps substantially its original form and assures a lining of uniform thickness throughout. The lining can, moreover, be carefully inspected before insertion to make sure that it is free from all defects. It may be desirable in some cases to cause a slight dissolving of the surface in contact with the body being lined which renders it adhesive and produces an intimate bond between the permeable body and the lining upon drying.

The following is a specific procedure given by way of example of one way to practice the process. A tube of polyvinyl alcohol is formed by extrusion, in known manner, having an external diameter of ¾ inch and a wall thickness of 1 mm. This tube is pulled inside of a heavy woven cotton tubing, similar to hose, having an internal diameter of 1 inch. Before the tube is drawn in, however, the cotton tubing is drawn through a water bath to thoroughly wet it, inside as well as outside. One end of the combined tube is then closed air-tight and the other end fitted with a shut-off cock which is attached to a source of compressed air. Air is admitted into the tube, to a pressure of one or two atmospheres, and the cock is closed. The tube is then drawn slowly through a steam bath, maintained at atmospheric pressure, so that each foot of hose is subjected to the steam for about a quarter of a minute. This time may readily be governed by inspection by watching the outer hose. When it is seen to expand slightly from the internal air pressure it has been treated long enough, as the lining has then expanded into intimate contact with it. Following the treatment in the steam bath, the hose is then dried, while still under pressure, for one or two hours at a temperature of from 50° to 60° C., after which the pressure may be released and the fittings removed. The completed hose is then ready for use.

It is not essential to wet the hose with the solvent prior to insertion of the lining, as given in the example, but doing so shortens the time required for the subsequent treatment in the steam bath. Without the wetting it is necessary to wait for the water, steam or other solvent to penetrate through the outer fabric. This part of the process will necessarily be varied according to the lining material used, appropriate solvents, with or without the additional step of heating, being selected to produce the desired softening of the lining material.

In the case of hollow bodies other than tubes, such as fiber containers, boxes and the like, the lining material may be pre-formed in any suitable way, as by molding or dipping, to approximately fit the inside of the body, then folded up, if necessary, and inserted through the opening, proper means being provided for the attachment of an inflating connection to the liner, which is thereafter inflated and treated as already described.

With hose such as tank hose which is provided with a helically coiled wire reinforcement, the inner surface is usually more or less corrugated in correspondence with the wire coils. Even in such a case no difficulties are encountered in inserting the lining and connecting it intimately with the wall because polyvinyl alcohol and substances having similar characteristics are sufficiently elastic to conform to the inner surface under the action of internal pressure. With such hose one may intensify the treatment so that not only is the surface of the lining somewhat dissolved, but the lining is softened to a greater extent. The lining may easily thus be caused to assume the corrugated form of the inside of the outer hose.

By the process herein described, manufacture of lined bodies is greatly simplified and the working time shortened. No special mechanism is required to carry out the inflation and that step takes no longer than the usual pressure test heretofore applied to such articles, the testing equipment being adequate for performing this step.

It being apparent that various modifications may be made in the detailed examples given by way of illustration, it is not intended to limit the invention thereto.

What is claimed is:

1. The process of producing hose or tubing having an outer covering of permeable fabric and an inner flexible lining of material having a basis of polyvinyl alcohol which comprises preforming a fabric tube and a lining of polyvinyl alcohol material, the latter having an external diameter such as to slide easily inside the fabric tube, inserting the lining in said fabric tube, subjecting said lining to fluid pressure applied internally and then subjecting the composite tube while under such pressure to an externally-applied hot aqueous bath which penetrates through the fabric and acts upon the lining for a time sufficient to soften the lining so as to cause it to expand and permanently unite with the fabric tubing, and thereafter drying the composite hose.

2. The process of producing hose or tubing having an outer covering of permeable fabric and an inner flexible lining of material having a basis of polyvinyl alcohol which comprises preforming a fabric tube and a lining of polyvinyl alcohol material, the latter having an external diameter such as to slide easily inside the fabric tube, inserting the lining in said fabric tube, subjecting said lining fluid pressure applied internally and then subjecting the composite tube while under such pressure to an externally-applied steam bath which penetrates through the fabric and acts upon the lining for a time sufficient to soften the lining so as to cause it to expand and to slightly dissolve its outer surface, whereby it is rendered sufficiently adhesive to permanently unite with the fabric tubing, and thereafter drying the composite hose.

3. The process of lining a permeable body with a material having a basis of polyvinyl alcohol comprising preforming said body and a lining of polyvinyl alcohol material of a shape adapted to fit within said body, inserting the lining in the body, filling said lining with a fluid under pressure to said lining, and subjecting the composite body and lining while under such pressure to an externally-applied hot aqueous bath which penetrates through said body and acts upon the lining for a time sufficient to soften the lining and cause it to expand against and adhesively unite with the said body, and thereafter drying said lined body.

4. The process of lining a hollow body of porous material with a material capable of being softened by a solvent which comprises the steps of forming a lining to fit into said body, inserting the lining in the body, subjecting the lining to fluid pressure applied internally, and then applying a solvent for the lining through said body to soften the lining while under pressure sufficiently to permit it to expand into contact with the body, the solvent action being sufficient to cause the material of the lining to penetrate into the pores of the body under the influence of the internal pressure, and thereafter removing the excess solvent to return the lining to substantially its original consistency, whereby a permanent bond is formed between the lining and the body when the excess solvent is removed,

ERNST SCHNABEL.